Oct. 12, 1948.  T. F. SCHLICKSUPP  2,451,359
ROTARY AND SLIDING BALL BEARING
Filed Nov. 2, 1946  2 Sheets-Sheet 1
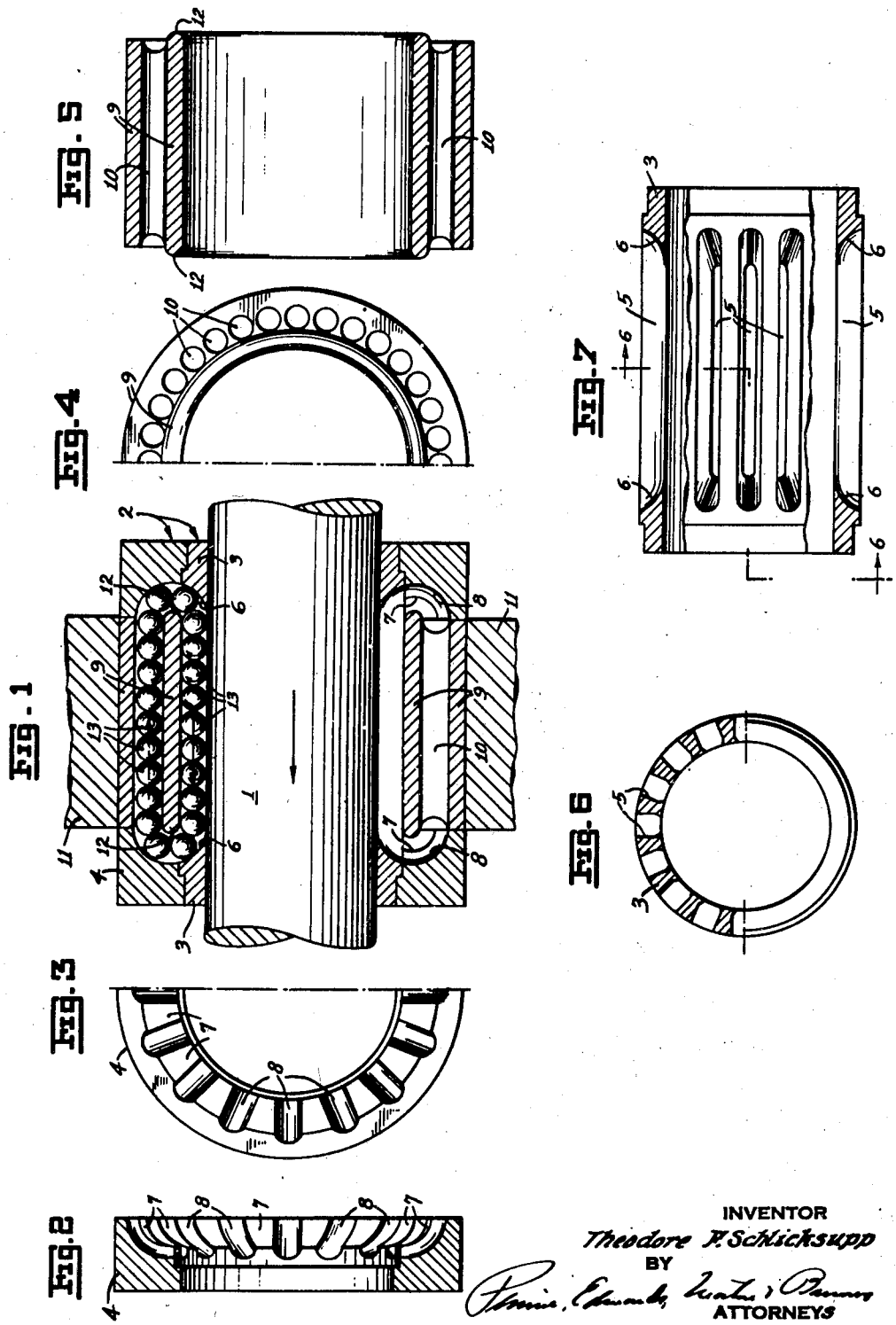
INVENTOR
Theodore F. Schlicksupp
BY
ATTORNEYS Oct. 12, 1948.   T. F. SCHLICKSUPP   2,451,359
ROTARY AND SLIDING BALL BEARING
Filed Nov. 2, 1946                2 Sheets-Sheet 2

INVENTOR
Theodore F. Schlicksupp
BY
ATTORNEYS

Patented Oct. 12, 1948

2,451,359

UNITED STATES PATENT OFFICE 2,451,359

ROTARY AND SLIDING BALL BEARING

Theodore F. Schlicksupp, Long Island City, N. Y.

Application November 2, 1946, Serial No. 707,465

5 Claims. (Cl. 308—6)

This invention relates to ball bearings.

It is frequently desirable to mount a shaft in a bearing so that the shaft can either rotate or slide rectilinearly in the bearing or the bearing can either rotate or slide on the shaft.

The principal object of the invention is to provide an improved antifriction ball bearing for shafts which will permit either relative rotary movement or relative rectilinear sliding movement between the shaft and bearing.

Figure 8:
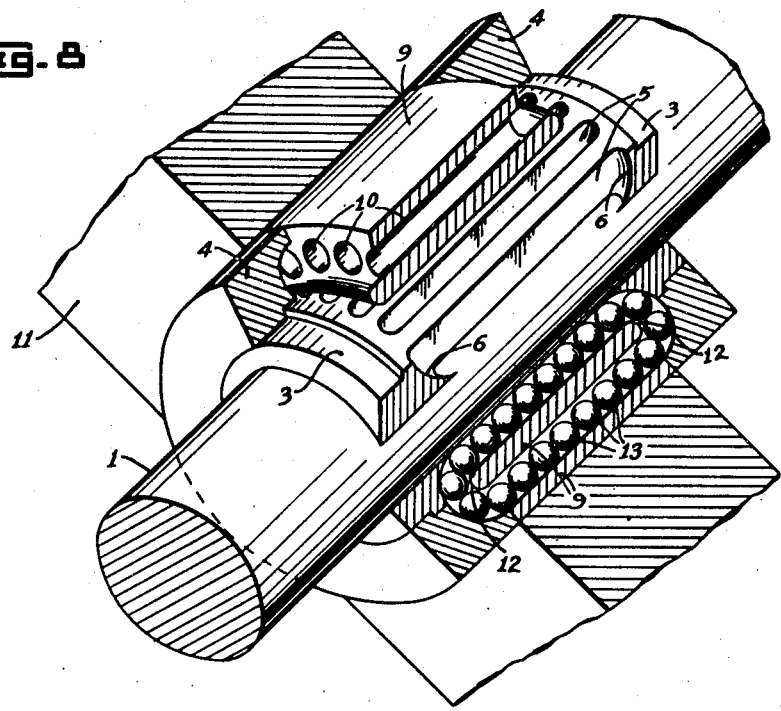
Figure 9:
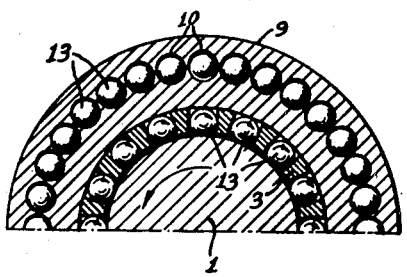

A rotary and sliding ball bearing embodying the invention is illustrated in the accompanying drawings, in which:

Figure 1 is a longitudinal section through the bearing;

Figs. 2–7, inclusive, illustrate the separate parts that are assembled to make up the bearing; Fig. 2 being a longitudinal section through one of the end ball-guiding rings on the race member, Fig. 3 a partial inside face view of such ring, Fig. 4 a partial end view of the outer sleeve containing the ball-return passages, Fig. 5 a longitudinal section through such sleeve, Fig. 6 a transverse section through the sleeve portion of the race member taken on the line 6—6 of Fig. 7, and Fig. 7 a side elevation partly in longitudinal section of the sleeve portion of the race member;

Fig. 8 is a cut-away perspective view of the assembled bearing with some of the antifriction balls omitted; and Fig. 9 is a partial transverse section through the bearing illustrating how the bearing functions when the shaft rotates in the bearing.

Referring first to Fig. 1, a shaft to be rotatably and slidably mounted in the ball bearing is represented at 1. The shaft fits loosely in a ball race member 2. This member comprises a sleeve-like portion 3, shown by itself in Fig. 7, and two end rings, 4, one of which is illustrated by itself in longitudinal section in Fig. 2 and in partial side view in Fig. 3. The sleeve-like portion 3 of the race member will hereinafter be referred to as the race sleeve. The end rings 4 have a force fit on the ends of the race sleeve 3 or are otherwise secured to it so that they constitute in effect unitary parts of the race member and rotate with the race sleeve when the latter rotates.

As best shown in Fig. 7 the race sleeve 3 has a number of parallel longitudinally extending slots 5 constituting portions of ball races. These slots extend entirely through the wall of the race sleeve 3 but are slightly narrower at the inner face of the race sleeve than at the outer face thereof, as best shown in Fig. 6. This prevents the bearing balls that are placed in the slots during assembly of the bearing from dropping inwardly through them. The end walls of each slot are curved upwardly as shown at 6.

The inner corner of each end ring 4 nearest the race sleeve 3 is cut out to give it a concave shape, as shown at 7 in Figs. 2 and 3. The concave surface thus formed is provided with a series of radially extending ball-guiding grooves 8. There is one of such radial grooves for each of the slots in the race sleeve, and in the assembled bearing the radial grooves in the end rings register with the slots in the race sleeve so that the two radial grooves at opposite ends of each slot constitute continuations of the ball race formed by the slot.

The race sleeve 3 fits freely within an outer ball-return sleeve 9 which is shown by itself in longitudinal section in Fig. 5 and in partial end view in Fig. 4. Extending longitudinally through the wall of the sleeve are a number of ball-return passages 10. The sleeve 9 is held in a housing 11 (Fig. 1) with a force fit, or is secured to the housing in any other suitable way. The outer peripheral portions of the end rings 4 abut loosely against the outer peripheral portion of the ball-return sleeve 9 so that the race member including the end rings is free to rotate relative to the sleeve held stationary by the housing 11. The opposite end portions of the sleeve 9 just inward of the ball-return passages 10 are convexed outwardly as shown at 12 in Figs. 1 and 5 so that the surfaces formed by these portions of the sleeve are substantially parallel to the curved end walls of the ball races, i. e., the curved end walls formed by the curved portions 6 at the ends of the slots 5 in the race sleeve plus the curved bottoms of the radial grooves in the end rings 4 as shown in Fig. 1.

Each of the ball-return passages 10 in the outer sleeve 9 and each of the slots 5 in the race sleeve 3, along with its corresponding ball-guiding grooves in the end rings 4, is completely filled with antifriction balls 13, as shown in the upper portion of Fig. 1. In the lower portion of Fig. 1 the balls are omitted so that all of the passages forming a complete ball circuit will show up more clearly. The balls are of such size in relation to the thickness of the wall of the race sleeve 3 that those balls which at any time happen to be in the portions of the slots 5 that extend entirely through the wall of the race sleeve will make contact with the shaft 1 and also with the inner cylindrical surface of the outer sleeve 9. These are the load-carrying balls. Those balls which roll in contact with the curved ends 6 of the slots 5 as well as the balls guided in the radial grooves 8 of the end rings 4, and all of the balls in the return passages 10 of the outer sleeve 9 carry no load and have free movement in their respective passages, it being understood that such passages are made large enough with respect to the size of the balls to permit their free movement. Also, it should be understood that the slots 5 in the race sleeve are slightly greater in width than the diameter of the balls to permit the balls to roll freely in the slots.

Fig. 8 is a cut-away perspective view of the assembled bearing, with most of the antifriction balls omitted to show the ball passages more clearly.

The operation of the bearing is as follows: When the shaft 1 rotates in the bearing all of the load-carrying balls in the slots 5 of the race sleeve 3 will be rolled by the shaft along the inner cylindrical face of the relatively stationary outer sleeve 9 and will thus progress circumferentially of the shaft. The balls will carry with them the race sleeve 3 and of course the end rings 4 which are rigidly fixed thereto. In other words, the entire race member 2 will progress with the balls circumferentially of the shaft. Of course, the progression of the balls and race member around the shaft will be at a slower angular speed than that of the rotating shaft. During rotation of the shaft and circular progression of the ball race all of the balls except the load-carrying balls will be idle. The balls resting on the curved end portions 6 of the slots 5 in the race sleeve, as well as the balls in the grooves 8 in the end rings 4, will of course partake in the circular progression of the race member, but all of the balls in the return passages 10 of the sleeve 9 will remain stationary in these passages. The manner in which the load-carrying balls roll between the surface of the shaft and the inner surface of the sleeve 9 is depicted in Fig. 9, it being assumed in this figure that the shaft is rotating in a counterclockwise direction, as indicated by the long arrow, to thereby roll the balls in a clockwise direction along the inner surface of the sleeve 9, as indicated by the short arrows.

When the shaft 1 slides rectilinearly in the bearing the load-carrying balls in each longitudinal slot in the race sleeve 3 will again roll in contact with the surface of the shaft and in contact with the inner surface of the sleeve 9, but in this case the balls will be rolled lengthwise of the slots 5 and longitudinally of the shaft. The balls ahead of the load-carrying balls in each slot of the race sleeve will be pushed along and guided radially outward by the corresponding groove 8 in the end ring 4 and will be delivered by this groove to one of the ball-return passages 10 in the outer sleeve 9. If the load-carrying balls progress in the direction of the straight solid-line arrow in Fig. 1, the balls pushed along by them in the ball-return passages in the sleeve 9 will progress in the direction of the dotted-line arrow. The race member is of course held against endwise movement when the shaft slides in the bearing due to the fact that the peripheral portions of the end rings 4 abut against the opposite ends of the sleeve 9 which in turn is held stationary by the housing 11.

In the particular bearing illustrated in the drawings there are twice as many ball-return passages 10 in the outer sleeve 9 as there are ball races in the race member in order to bring them close together. If the radial grooves 8 in the end rings 4 do not exactly register with one set of alternate ball-return passages, this set of the passages will automatically be brought into full registry with the grooves when the shaft starts its sliding movement because the balls in trying to wedge themselves into the return passages will cause enough circumferential displacement of the race member to line up the set of return passages with the grooves. Thus, when the shaft slides rectilinearly in the bearing the antifriction balls operate in a number of individual circuits disposed around the shaft, each circuit being endless and having one run in which the load-carrying balls roll in contact with the shaft and with the inner surface of the sleeve 9 and having another run in the outer sleeve 9 in which the balls are returned, the balls being guided to and from the return passages in the sleeve 9 by the curved portion 6 at the ends of the slots in the race sleeve and by the radial ball-guiding grooves 8 in the end rings 4.

In the foregoing description of the operation of the bearing it has been assumed that the rotary or sliding movement of the shaft is relative to the bearing, but it will be understood that the shaft may be stationary and the entire bearing may slide axially of the shaft, or the housing 11 and the sleeve 9 may rotate about the stationary shaft, causing rotation of the load-carrying balls circumferentially of the shaft and their progression around the shaft along with the race member 2.

I claim:

1. A rotary and sliding ball bearing comprising a race member having a race sleeve adapted to surround a shaft, an outer sleeve surrounding the race sleeve, said race member and outer sleeve being relatively rotatable, the race sleeve having a number of longitudinally extending slots and said outer sleeve having a number of longitudinal ball-return passages, means at opposite ends of the race member for establishing a ball-guiding path from opposite ends of each longitudinal slot in the race sleeve to opposite ends of a ball-return passage in said outer sleeve to thereby provide an endless ball circuit, and antifriction balls completely filling each of such endless ball circuits, at least some of the balls in the longitudinal slots in the race sleeve constituting load-carrying balls adapted when the bearing is assembled on a shaft to make rolling contact with the surface of the shaft and the inner surface of the outer sleeve.

2. A rotary and sliding ball bearing comprising a race member having a sleeve portion adapted to surround a shaft, an outer member having an inner cylindrical surface surrounding said sleeve portion of the race member, said race member and said outer member being relatively rotatable, said sleeve portion of the race member having a number of longitudinally extending slots and said outer member having a number of longitudinal ball-return passages, the race member also having means at its opposite ends for establishing a ball-guiding path from opposite ends of each longitudinal slot in the sleeve portion of the race member to opposite ends of a ball-return passage in said outer member to thereby provide an endless ball circuit, and antifriction balls completely filling each of said endless ball circuits, at least some of the balls in the longitudinal slots in said sleeve portion of the race member constituting load-carrying balls adapted when the bearing is assembled on a shaft to make rolling contact with the surface of the shaft and said inner cylindrical surface of the outer member.

3. The combination with a shaft of a ball bearing comprising a race member having a cylindrical race sleeve adapted to surround the shaft, an outer sleeve surrounding the race sleeve, the shaft and said outer sleeve being relatively rotatable and the race member being rotatable relative to the shaft and sleeve, the race sleeve having a number of longitudinal slots and the outer sleeve having a number of longitudinal ball-return passages, means at opposite ends of the race member for establishing a ball-guiding path from opposite ends of each longitudinal slot in the race sleeve to opposite ends of a ball-return passage in said outer sleeve to thereby provide an endless ball circuit, and antifriction balls completely filling each of such endless ball circuits, at least some of the balls in the longitudinal slots in the race sleeve constituting load-carrying balls and making rolling contact with the surface of the shaft and the inner surface of the outer sleeve.

4. A rotary and sliding ball bearing comprising a race member having a race sleeve adapted to surround a shaft and provided with a number of longitudinal slots, an outer sleeve having a plurality of longitudinal ball-return passages, said race member and said outer sleeve being relatively rotatable, annular end members secured to opposite ends of said race sleeve and forming part of the race member and adapted to establish a ball-guiding path from each end of each longitudinal slot in the race sleeve to the corresponding end of a ball-return passage in said outer sleeve to thereby provide an endless ball circuit, and antifriction balls completely filling each of such endless ball circuits, at least some of the balls in the longitudinal slots in the race member constituting load-carrying balls adapted when the bearing is assembled on a shaft to make rolling contact with the surface of the shaft and the inner surface of the outer sleeve whereby relative rotation between the shaft and the outer sleeve will cause said load-carrying balls to roll between the shaft and inner surface of the sleeve and progress circumferentially of the shaft moving the race member with them, and whereby relative sliding movement between the shaft and the bearing will cause the load-carrying balls to be rolled between the shaft and inner surface of the outer sleeve in a direction longitudinally of the shaft thereby causing all of the balls in each ball circuit to progress so that the balls in each slot in the race member will move in one direction and the balls in the corresponding ball-return passage in the outer sleeve will move in the opposite direction.

5. The combination with a shaft of a ball bearing comprising a rotatable race member having a race sleeve loosely surrounding the shaft and provided with a number of longitudinally extending slots constituting portions of ball races, an outer sleeve loosely surrounding said race sleeve, a housing in which said outer sleeve is fixedly held, said outer sleeve having a plurality of longitudinal ball-return passages, the race member having end members fixed to the ends of the race sleeve and rotatable with the race member, said end members having radial ball-guiding grooves forming extensions of the race portions in the race sleeve and with which the ball-return passages in the outer sleeve are adapted to register, and antifriction balls filling the races in the race member and the return passages in the outer sleeve, at least some of the balls in the slots in the race member constituting load-carrying balls and making rolling contact with the surface of the shaft and the inner surface of the outer sleeve whereby relative rotation between the shaft and the outer sleeve will cause said load-carrying balls to roll between the shaft and inner surface of the outer sleeve and progress circumferentially of the shaft moving with them the ball race and its end members, and whereby relative sliding movement between the shaft and the bearing will cause the load-carrying balls in each race in the race member to roll between the shaft and the inner surface of the outer sleeve and progress longitudinally of the shaft thereby moving the balls ahead of them outwardly through the radial grooves in one of said end members and into one of the return passages in said outer sleeve.

THEODORE F. SCHLICKSUPP.

REFERENCES CITED

The following references are of record in the file of this patent:

UNITED STATES PATENTS

| Number | Name | Date |
| --- | --- | --- |
| 1,094,972 | Bacorselski | Apr. 28, 1914 |

FOREIGN PATENTS

| Number | Country | Date |
| --- | --- | --- |
| 125,573 | Austria | 1931 |
| 755,957 | France | 1933 |